(12) United States Patent
Lang et al.

(10) Patent No.: US 10,086,587 B2
(45) Date of Patent: Oct. 2, 2018

(54) SANDWICH STRUCTURES INCLUDING A POLYMERIC/ELECTRICALLY NON-CONDUCTING CORE FOR WELDABILITY

(71) Applicant: GM GLOBAL TECHNOLOGY OPERATIONS LLC, Detroit, MI (US)

(72) Inventors: Steven C. Lang, Columbus, MI (US); Nilesh D. Mankame, Ann Arbor, MI (US); Wayne W. Cai, Troy, MI (US)

(73) Assignee: GM GLOBAL TECHNOLOGY OPERATIONS LLC, Detroit, MI (US)

( * ) Notice: Subject to any disclaimer, the term of this patent is extended or adjusted under 35 U.S.C. 154(b) by 717 days.

(21) Appl. No.: 14/597,168

(22) Filed: Jan. 14, 2015

(65) Prior Publication Data
US 2016/0200074 A1 Jul. 14, 2016

(51) Int. Cl.
| | |
|---|---|
| B23K 11/16 | (2006.01) |
| B23K 11/20 | (2006.01) |
| B23K 26/22 | (2006.01) |
| B23K 20/12 | (2006.01) |
| B32B 15/08 | (2006.01) |
| B32B 15/04 | (2006.01) |
| B23K 11/11 | (2006.01) |
| B23K 31/02 | (2006.01) |
| B32B 15/01 | (2006.01) |

(Continued)

(52) U.S. Cl.
CPC .............. *B32B 15/08* (2013.01); *B23K 11/11* (2013.01); *B23K 20/122* (2013.01); *B23K 26/22* (2013.01); *B23K 31/02* (2013.01); *B32B 3/08* (2013.01); *B32B 3/12* (2013.01); *B32B 3/266* (2013.01); *B32B 15/012* (2013.01); *B32B 15/043* (2013.01); *B32B 27/16* (2013.01); *B32B 2250/05* (2013.01); *B32B 2307/206* (2013.01); *B32B 2307/752* (2013.01); *B32B 2605/08* (2013.01)

(58) Field of Classification Search
CPC ......... B23K 11/16; B23K 11/18; B23K 11/20; B23K 2201/006; B23K 26/21; B23K 26/22; B23K 20/12; B23K 20/122
See application file for complete search history.

(56) References Cited

U.S. PATENT DOCUMENTS 4,427,869 A * 1/1984 Kimura ................. B23K 11/14
219/86.9
7,382,959 B1 6/2008 Jacobsen
(Continued)

FOREIGN PATENT DOCUMENTS

| FR | 2713119 A1 * | 6/1995 |
| JP | 05-228643 A * | 9/1993 |
| JP | 07-096380 A * | 4/1995 |

OTHER PUBLICATIONS

Machine translation of Japan Patent document No. 7-96,380, Oct. 2017.*

*Primary Examiner* — Geoffrey S Evans
(74) *Attorney, Agent, or Firm* — Cantor Colburn LLP

(57) ABSTRACT

A technique for welding two dissimilar metal panels or structures together, such as vehicle structures, by providing a sandwich structure between the dissimilar metal structures that includes one skin being made of the same metal as one of the metal structures and an opposing skin being made of the same metal as the other metal structure, and including an electrically non-conducting core between the skins.

14 Claims, 3 Drawing Sheets

(51) Int. Cl.
*B32B 27/16* (2006.01)
*B32B 3/08* (2006.01)
*B32B 3/12* (2006.01)
*B32B 3/26* (2006.01)

(56) References Cited

U.S. PATENT DOCUMENTS

| | | | |
|---|---|---|---|
| 7,653,279 B1 | 1/2010 | Jacobsen | |
| 8,476,549 B2* | 7/2013 | Nakagawa | B23K 11/115 219/78.01 |
| 8,753,463 B2* | 6/2014 | Fuchs | B23K 11/11 156/313 |
| 9,180,548 B2* | 11/2015 | Khakhalev | B23K 11/14 |
| 2006/0255098 A1* | 11/2006 | Runyan | B21D 26/055 228/112.1 |
| 2007/0187469 A1* | 8/2007 | Chen | B23K 20/122 228/112.1 |
| 2009/0065484 A1* | 3/2009 | Wang | B23K 11/115 219/118 |
| 2010/0305757 A1* | 12/2010 | Sonner | B23K 26/02 700/262 |
| 2011/0104515 A1* | 5/2011 | Kou | B23K 20/1265 428/649 |
| 2013/0017406 A1* | 1/2013 | Kinefuchi | B60R 19/03 428/594 |
| 2013/0189023 A1* | 7/2013 | Spinella | B23K 11/0026 403/270 |
| 2014/0248508 A1* | 9/2014 | Ohhama | B32B 15/043 428/638 |
| 2014/0294489 A1* | 10/2014 | Sakai | B62D 25/02 403/267 |
| 2015/0175207 A1* | 6/2015 | Hata | B23K 20/122 280/785 |
| 2016/0184919 A1* | 6/2016 | Chergui | B23K 11/0026 219/91.21 |
| 2016/0288241 A1* | 10/2016 | Chergui | B23K 11/00 |

* cited by examiner

SANDWICH STRUCTURES INCLUDING A POLYMERIC/ELECTRICALLY NON-CONDUCTING CORE FOR WELDABILITY

BACKGROUND OF THE INVENTION

Field of the Invention

This invention relates generally to a sandwich structure including a non-conducting core that is employed to weld different metal structures together and, more particularly, to a method for welding different vehicle metal panels together using a sandwich structure having a non-conducting core so as to eliminate galvanic corrosion between the panels.

Discussion of the Related Art

A typical vehicle will include a configuration of structural support members, sometimes referred to as a vehicle frame or chassis, that are secured together in a desired configuration using suitable bolts, welds, adhesives, etc. In order to provide a desired combination of style, strength and weight of the vehicle, these structural elements are often made of different metals, such as aluminum and steel. When different electrically conductive metal components are secured together by welds, bolts, etc., galvanic corrosion sometimes occurs at the interface between the different metals, which reduces the integrity of the material at the joint over time. Various procedures are known in the art to reduce galvanic corrosion between two dissimilar metals, such as by providing a non-electrical barrier or coating on the metal structural elements, for example, providing anodized aluminum. Although these known techniques for reducing or eliminating galvanic corrosion have been generally successful, improvements can still be made.

It is known in the art to provide vehicle structural members having sandwich structures. These structural members can generally be categorized into three designs, namely, hollow beams that are fully or partially reinforced with a polymer or metallic foam, single or dual-sided facesheets reinforced with a honeycomb-like cellular core, and formed composite structural member. For hollow metallic or polymer matrix composite tube structures, which are fully or partially reinforced with a lightweight foam core, the material used for the core can be either a metallic or polymeric foam that is bonded, mechanically attached or interference fit into the tube structure. The purpose of the core is to carry shear loads in the sandwich structures and absorb energy in the event of a low or high speed impact, which is a distinction dependent on the density and composition of the foam. The use of honeycomb or honeycomb-like ordered cellular cores to provide reinforcement to one or two flat facesheets have an open-sided sandwich designs and have honeycomb, discrete-stiffened or wine-crate structures extending from the front face of the structural member back towards the passenger compartment of the vehicle.

It is also known in the art to fabricate a three-dimensional network of photopolymer waveguides comprising a unitary truss or lattice architecture, hereafter referred generally as a micro-truss structure or micro-truss core. For example, U.S. Pat. Nos. 7,653,279 and 7,382,959 disclose a process for fabricating such a micro-truss structure. Generally, the process includes providing a reservoir or mold filled with a volume of a curable monomer and covered by a mask including strategically positioned apertures. UV light sources are positioned relative to the mask and exposure to collimated UV light through the mask apertures forms a series of interconnected self-propagating photopolymer waveguides, referred to herein as struts, to form the truss or lattice architecture. Once the photopolymer waveguides are formed, the reservoir is emptied of the unpolymerized monomer which was not exposed to UV light. The micro-truss structure may then undergo a post-cure operation to increase the cross-link density in the photopolymer waveguides. This post-cure may be accomplished via a thermal cure, an additional exposure to UV light, an equivalent method or combinations thereof.

SUMMARY OF THE INVENTION

The present disclosure discloses a technique for welding two dissimilar metal panels or structures together, such as vehicle structures, by providing a sandwich structure between the dissimilar metal structures that includes one skin being made of the same metal as one of the metal structures and an opposing skin being made of the same metal as the other metal structure, and including a polymeric or electrically non-conducting core between the skins.

Additional features of the present invention will become apparent from the following description and appended claims, taken in conjunction with the accompanying drawings.

DETAILED DESCRIPTION OF THE EMBODIMENTS

Figure 1:
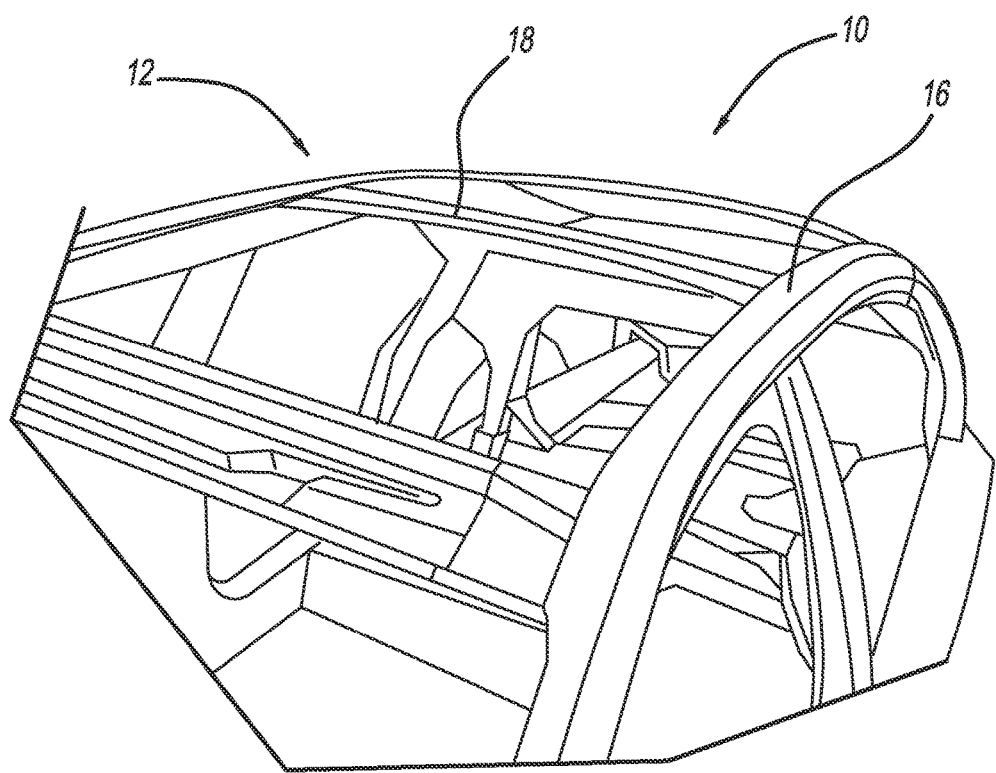
FIG. 1 is a broken-away isometric view of a portion of a vehicle roof frame.

The following discussion of the embodiments of the invention directed to techniques for welding two dissimilar vehicle metal structural elements using a sandwich structure positioned therebetween is merely exemplary in nature, and is in no way intended to limit the invention or its applications or uses. For example, although the invention is specifically referred to for vehicle structural elements, those skilled in the art will appreciate that the techniques can be employed for other structural configurations including non-automotive applications. Other industries where the invention as described herein may have application include, for example, aerospace, building construction and related equipment, etc.

As will be discussed in detail below, the present invention proposes various techniques for welding two dissimilar metal structural elements of a vehicle by providing a sandwich structure between the structural elements, where the sandwich structure includes one skin having the same type of metal as one of the structural elements and an opposing skin having the same type of metal as the other structural element, and an electrically non-conducting core positioned therebetween so as to eliminate galvanic corrosion between the metal structural elements. In one embodiment, the sandwich structure is a micro-truss structure formed by known micro-truss fabrication techniques.

As mentioned above, it is known in the art to fabricate a micro-truss structure as a three-dimensional network of photopolymer waveguides comprising a unitary truss or lattice architecture. The micro-truss core material possesses increased stiffness and strength versus alternative stochastic sandwich core materials, such as metal or polymeric foams, given that it enables precise control of the material's spatial arrangement. Higher stiffness and strength in the sandwich core translates into a reduced repair cost in the event of low speed impacts. Micro-truss core materials can be manufactured at much lower costs as compared to other high-strength and high-stiffness core materials, such as metallic or composite honeycombs. Because the micro-truss core can be formed in place and directly bonded onto curved surfaces, fasteners and angled faces, it eliminates the need for costly secondary machining and multi-stage bonding operations associated with honeycomb cores. The micro-truss fabrication process enables functional grading, spatial control of the physical and mechanical properties of the core in all three-dimensions using a single material, something which is not possible with all of the other sandwich core forms that have homogeneous physical and mechanical properties at different locations in the core. In a sandwich structure, functional grading can be used to provide enhanced structural support in localized regions of the member, such as attachment points, the member mid-span or likely impact locations. Polymer micro-truss core materials can be integrated into sandwich designs containing aluminum, steel, or carbon fiber reinforced polymer facesheets, or any combination thereof, without the need for corrosion prevention devices or coatings. This is not the case for core materials such as aluminum honeycombs or foams, which require galvanic protection when applied to steels or carbon fiber reinforcement polymers. The use of a sandwich construction, particularly one with a micro-truss core, also opens up the design space for structural members to form geometries that cannot be manufactured using monolithic metal for fiber reinforced polymer composites alone. The sandwich design can circumvent inherent limits for extrusion, pultrusion, stamping, and laminating processes by utilizing simple shapes for the metal or composite facesheet materials to create a complex geometry sandwich.

The micro-truss core in the sandwich structure is composed of an ordered three-dimensional network of self-propagating polymer waveguides grown from a photo-monomer resin using a controlled exposure to collimated UV light sources at specified orientations through a plurality of apertures in a mask. Any UV-curable photo-monomer or blend thereof that displays the self-propagation phenomenon can be used to form the micro-truss or micro-lattice architecture. Alternatively, the micro-truss structure may be formed using the aforementioned photo-polymerization technique and then converted or augmented via electro or electro-less plating, reverse casting, vapor deposition, oxidation, dip coating, sputtering, or other suitable process into a hollow or solid metallic, ceramic, or polymer material different from the initial photopolymer. In certain embodiments of the sandwich structure manufacturing process, the micro-truss core is grown directly on one of the two sandwich facesheets. The other facesheet is then joined to the core using an adhesive material applied to the facesheet and/or the micro-truss. This adhesive may be composed of a single or multi-part paste for a continuous sheet of film. Additional materials, such as glass, scrim or syntactic fillers, may be added to the adhesive to maintain control of the bond line thickness.

FIG. 1 is a cut-away, isometric view of a frame assembly 12 of a vehicle roof for a vehicle 10. The frame assembly 12 includes a number of structural elements including side bars 16 and cross-bars 18. The structural elements may be fabricated out of steel as a body-in-white (BIW) assembly of the vehicle 10, where an aluminum roof panel is later mounted to the bars 16 and 18 creating the potential for galvanic corrosion.

Figure 2:
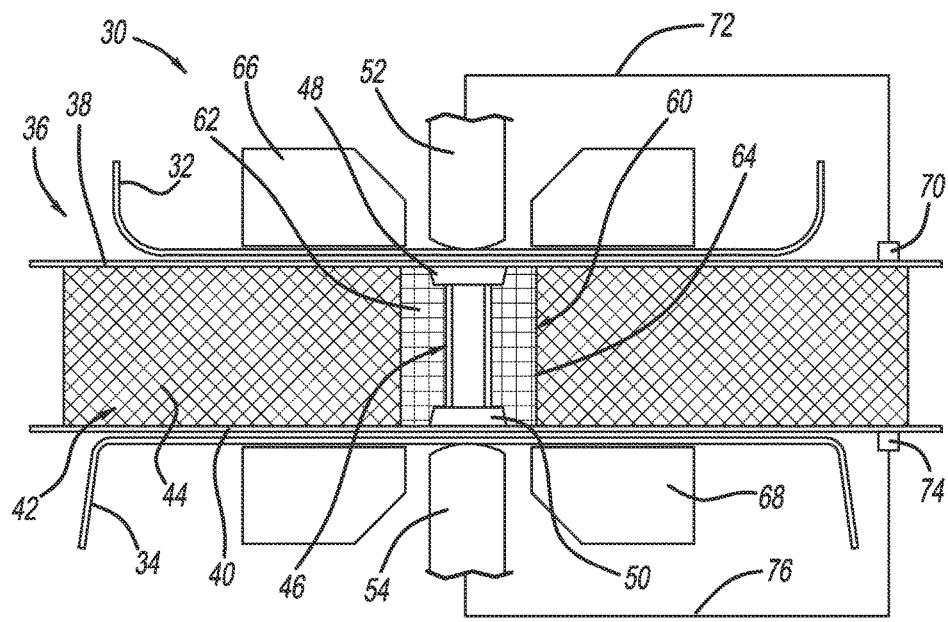
FIG. 2 is a cross-sectional type illustration of a welding assembly for resistance spot welding of two dissimilar metal structures including a sandwich structure between the structures having one skin made of one of the metals and another skin made of the other metal and an electrically non-conducting core therebetween.

FIG. 2 is a cross-sectional type illustration of a welding assembly 30 for a resistance spot welding (RSW) process for securing two vehicle metal structures together, shown here as a steel structure 32 and an aluminum structure 34. As discussed above, it is desirable to provide techniques that reduce or eliminate galvanic corrosion between dissimilar metal structures being welded together. To accomplish this, the assembly 30 includes a sandwich structure 36 positioned between the structures 32 and 34 that includes a first skin 38, a second skin 40 and an electrically non-conductive core 42 positioned therebetween. In this non-limiting embodiment, the sandwich structure 36 is a micro-truss structure of the type discussed above, where the core 42 is a micro-truss core including lattice struts 44 fabricated by known micro-truss fabrication techniques. Other types of sandwich structures can also be employed. In this embodiment, the skin 38 is made of steel and is positioned against the steel structure 32 and the skin 40 is made of aluminum and is positioned against the aluminum structure 34 so that galvanic corrosion does not occur between the structure 32 and the skin 38 and the structure 34 and the skin 40.

During the micro-truss fabrication process of the sandwich structure 36, openings are formed in the core 42 in which an electrically non-conducting mechanical support 46, such as a suitable plastic, ceramic or composite post, can be positioned. The mechanical support 46 includes one end 48 positioned against an inner surface of the skin 38 opposite to the structure 32 and an opposing end 50 positioned against an inner surface of the skin 40 opposite to the structure 34. The mechanical support 46 provides rigidity against a clamping force that may be provided by a welding electrode 52 positioned against an outer surface of the structure 32 opposite to the skin 38 and a welding electrode 54 positioned against an outer surface of the structure 34 opposite to the skin 40 during the welding process.

The welding process generates significant heat that is necessary to melt the particular metal structures to form the weld bond, as is well understood in the art. That heat is typically too extreme for the polymer of the micro-truss core 42. Thus, cooling techniques are needed to insure that the core 42 does not become damaged during the welding operation. For one cooling technique, the micro-truss structure 36 includes an insert 60 positioned around the support 46 and in contact with the core 42 that includes cooling passages 62 that allow a cooling fluid, such as air, to flow therethrough, which prevents heat generated by the welding process from damaging the core 42. The insert 60 can be made of any suitable material, such as a suitable plastic, that is not damaged by the heat of the welding process, and can provide some structural integrity between the skins 38 and 40. Further, the insert 60 can be configured with barriers 64 so that the cooling fluid does not enter the core 42. In addition to providing the cooling fluid flow channel 62 between the skins 38 and 40 to draw away heat, upper heat sinks 66 can be positioned adjacent to the electrode 52 against the structure 32 opposite to the skin 38 and lower heat sinks 68 can be positioned adjacent to the electrode 54 against the structure 34 opposite to the skin 40.

In a typical resistance spot welding technique using opposing electrodes, the current that causes the weld travels through the electrodes and the structure being welded therebetween. In the assembly 30, the support 46 is made of an electrically insulating material so as to prevent an electrical connection between the electrodes 52 and 54. In order to overcome this limitation, the assembly 30 includes a conductive stud 70 electrically coupled to the skin 38 that makes an electrical connection with the electrode 52 on line 72 to provide a closed current loop. Likewise, a conductive stud 74 is electrically coupled to the skin 40 that makes an electrical connection with the electrode 54 on line 76 to provide a closed current loop. Thus, a clamping force between the electrodes 52 and 54 can be provided as one required part of the welding process, and a separate electrical connection can be provided for the electrodes 52 and 54 as described. It is noted that the assembly 30 shows a two-sided resistive spot welding operation where both of the skins 38 and 40 are welded simultaneously. The same welding technique as described herein can be used for a one-sided resistive spot welding technique, where only one skin is being welded at a time and the other side is supported by a suitable support.

Figure 3:
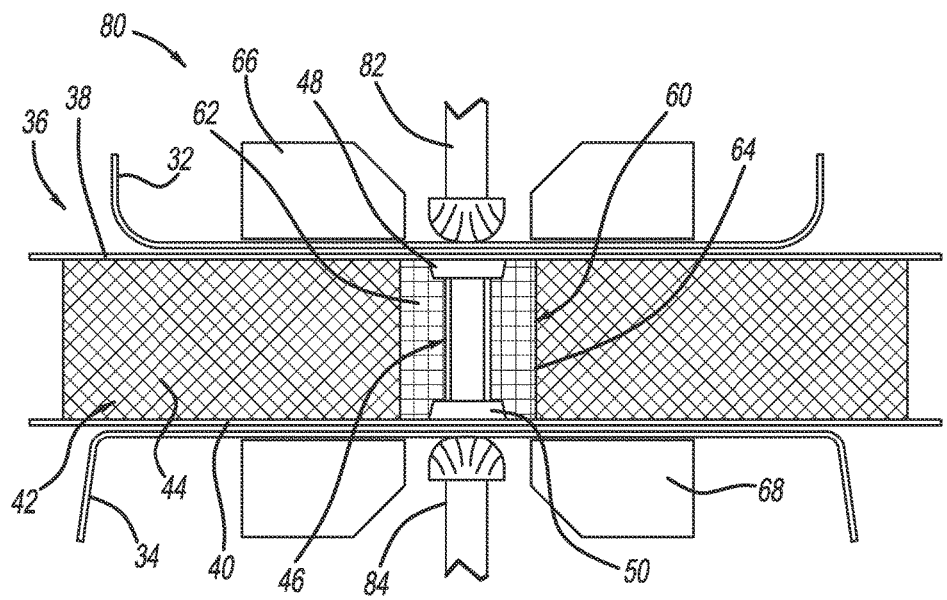
FIG. 3 is a cross-sectional type illustration of a welding assembly for friction stir welding of two dissimilar metal structures including a sandwich structure between the structures having one skin made of one of the metals and another skin made of the other metal and an electrically non-conducting core therebetween.

The assembly 30 employs a resistance spot welding process to join two dissimilar metals. Other types of welding processes are known in the art that also may benefit by using a sandwich structure for welding two dissimilar metals together to prevent galvanic corrosion. FIG. 3 is a cross-sectional type illustration of an assembly 80 for a friction stir welding process, where like elements to the assembly 30 are identified by the same reference number. As is well understood by those skilled in the art, friction stir welding includes mechanically spinning an appropriate configured probe on the structures being joined so as to create heat by friction that yields the weld bond. Pressure is necessary to be applied to the probe during the procedure, where an opposite side of the particular structure from the probe is typically supported on a suitable support, such as an anvil.

In the assembly 80, a rotatable friction probe 82 is positioned against the structure 32 at the location where the structure 32 is being welded to the skin 38 and a rotatable friction probe 84 is positioned against the structure 34 at the location where the structure 34 is being welded to the skin 40. To provide the weld, the probes 82 and 84 are spun at the appropriate speed to provide the friction necessary to generate the heat to provide the weld. If the process is only welding the structure 32 to the skin 38, the probe 84 can be a support anvil, where the support 46 provides mechanical support between the probes 82 and 84. Alternately, if only the structure 34 is being welded to the skin 40, then the probe 82 can be the support anvil, where the support 46 provides mechanical support between the probes 82 and 84. In yet an alternate embodiment, it is possible that the probes 82 and 84 can both be operated simultaneously. Because the friction stir welding process does not require current flow, the support 46 does not need to be electrically non-conductive in this embodiment.

Figure 4:
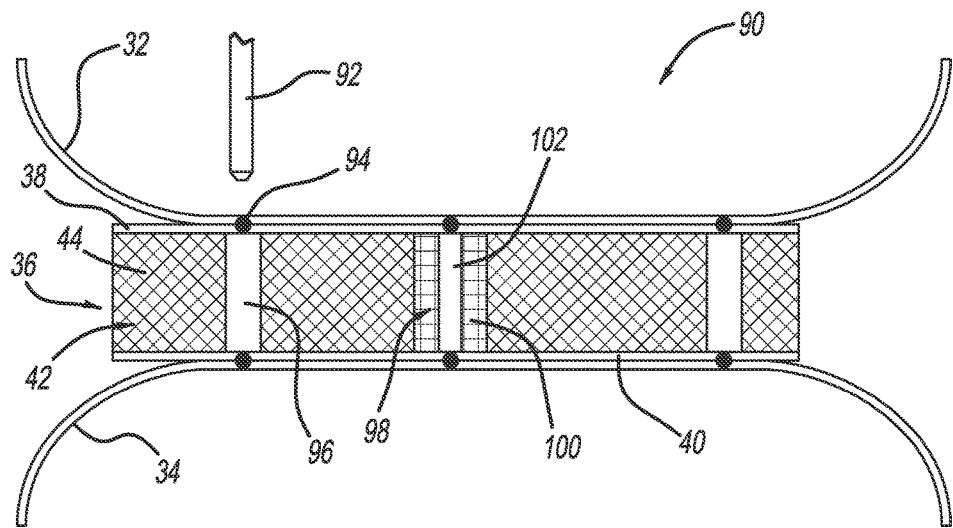
FIG. 4 is a cross-sectional type illustration of a welding assembly for laser welding of two dissimilar metal structures including a sandwich structure between the structures having one skin made of one of the metals and another skin made of the other metal and an electrically non-conducting core therebetween.

FIG. 4 is a cross-sectional type illustration of a welding assembly 90 for laser spot welding two dissimilar metal structures, where like elements to the assembly 30 are identified by the same reference number. The assembly 90 includes a laser beam source 92 that generates a laser beam having a suitable intensity to melt the metal structures being welded to provide a weld joint. In this example, a series of weld joints 94 are shown where the laser source 92 has welded the structure 32 to the skin 38 and the structure 34 to the skin 40. Laser welding does not require an electrical current through the structures being welded, but requires the laser beam to cause the heat energy to provide the weld joint. However, the heat generated for the amount of time required to provide the weld joints 94 may be less than other welding processes, where less robust heat sinking can be employed. In the assembly 90, for those welding operations where low heat may be generated, a void 96 or local divot (not shown) in the core 42 can be provided between the weld joints 94 so that the core 42 is not positioned in direct contact with the weld area, but is spaced some distance therefrom. Additionally, an insert 98 including cooling channels 100 can be provided between the weld joints 94, which may have a similar design to the insert 60. Further, an electrically non-conductive support 102 can be provided between the skins 38 and 40 if necessary for mechanical support in an area where part of the core 42 has been removed.

Figure 5:
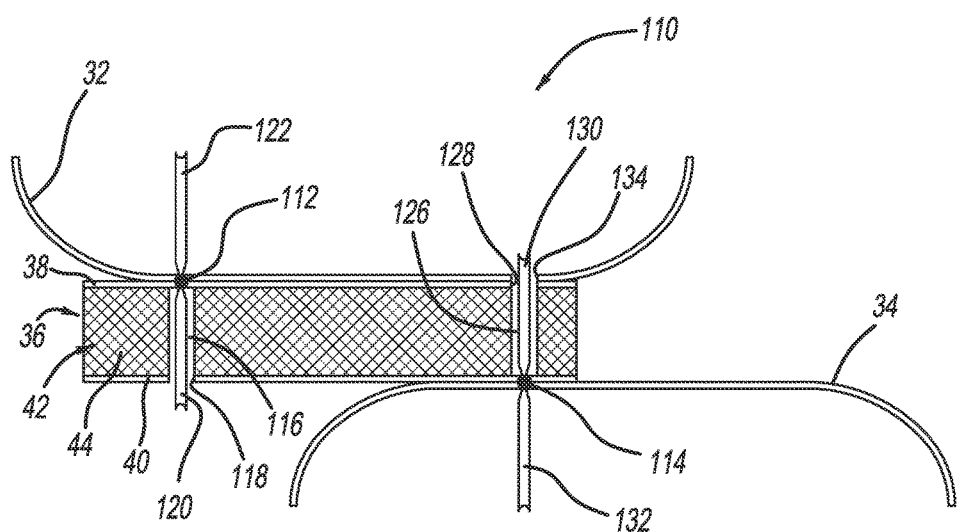
FIG. 5 is a cross-sectional type illustration of another welding assembly for brazing two dissimilar metal structures including a sandwich structure between the structures having one skin made of one of the metals and another skin made of the other metal and an electrically non-conducting core therebetween.

FIG. 5 is a cross-sectional type illustration of a welding assembly 110 for an alternate embodiment for a resistance spot welding process or brazing, where like elements to the assembly 30 are identified by the same reference number. In this process, a more traditional approach is being employed where a weld joint 112 is formed at the location where the structure 32 is joined to the skin 38 and a weld joint 114 is formed at the location where the structure 34 is joined to the skin 40. In order to provide the weld joint 112, an opening 116 is provided in the core 42 and an opening 118 is provided in the skin 40 that are aligned so that an electrode 120 can be inserted through the skin 40 and the core 42 to contact an opposite side of the skin 38 from the structure 32, as shown. An opposing electrode 122 is provided on an opposite side of the structure 32 at its outer surface so that a direct electrical current can be provided between the electrodes 120 and 122 and through the skin 38 and the structure 32 to provide the weld joint 112. Likewise, in order to provide the weld joint 114, an opening 126 is provided in the core 42 and an opening 128 is provided in the skin 38 that are aligned so that an electrode 130 can be inserted through the skin 38 and the core 42 to contact an opposite side of the skin 40 from the structure 34, as shown. An opposing electrode 132 is provided on an opposite side of the structure 34 at its outer surface so that a direct electrical current can be provided between the electrodes 130 and 132 and through the skin 40 and the structure 34 to provide the weld joint 114. In this configuration of the structures 32 and 34, an opening 134 also needs to be provided through the structure 32. Although not specifically shown, the edges of the openings 116 and 126 can be sealed so as to prevent debris, coolant, etc. from entering the core 42 during the welding process.

The foregoing discussion disclosed and describes merely exemplary embodiments of the present invention. One skilled in the art will readily recognize from such discussion and from the accompanying drawings and claims that various changes, modifications and variations can be made therein without departing from the spirit and scope of the invention as defined in the following claims.

What is claimed is:

1. A welding assembly comprising:
   a first structure being made of a first metal;
   a second structure being made of a second metal that is different than the first metal;
   a sandwich structure positioned between the first structure and the second structure, said sandwich structure including a first skin being made of the first metal and positioned against the first structure, a second skin being made of the second metal and positioned against the second structure and an electrically non-conducting core positioned between the first skin and a second skin; and
   a resistance spot welding assembly configured to weld the first structure to the first skin and the second structure to the second skin, wherein the resistance spot welding assembly comprises a spot welding electrode positioned against the first structure opposite to the first skin and a spot welding electrode positioned against the second structure opposite to the second skin, and further comprises other spot welding electrodes, wherein the second structure and the core include a first set of aligned openings where one of the other spot welding electrodes extends through the first set of aligned openings to contact the first skin opposite to the spot welding electrode positioned against the first structure, and the first structure and the core include a second set of aligned openings where another spot welding electrode extends through the second set of aligned openings to contact the second skin opposite to the spot welding electrode positioned against the second structure.

2. The welding assembly according to claim 1 wherein the sandwich structure is a micro-truss structure and the electrically non-conducting core is a micro-truss core.

3. The welding assembly according to claim 1 wherein the sandwich structure includes an electrically non-conducting mechanical support positioned within the core at the site of a weld joint and being in contact with the first skin and the second skin.

4. The welding assembly according to claim 3 wherein the sandwich structure includes an insert positioned around the support that includes cooling fluid flow channels.

5. The welding assembly according to claim 1 wherein the first metal is steel and the second metal is aluminum.

6. The welding assembly according to claim 1 wherein the first and second structures are vehicle structures.

7. A method for welding two structures together, said method comprising:
   providing a first structure being made of a first metal;
   providing a second structure being made of a second metal that is different than the first metal;
   providing a sandwich structure positioned between the first structure and the second structure, said sandwich structure including a first skin being made of the first metal and positioned against the first structure, a second skin being made of the second metal and positioned against the second structure and an electrically non-conducting core positioned between the first skin and a second skin; and
   welding the first structure to the first skin and welding the second structure to the second skin, where welding is performed using one of resistance spot welding, friction stir welding or laser welding.

8. The method according to claim 7 wherein providing a sandwich structure includes providing a sandwich structure that is a micro-truss structure where the electrically non-conducting core is a micro-truss core.

9. The method according to claim 7 wherein providing a sandwich structure includes providing a sandwich structure having an electrically non-conducting mechanical support positioned within the core and being in contact with the first skin and the second skin.

10. The method according to claim 9 wherein providing a sandwich structure includes providing a sandwich structure having an insert positioned around the support that includes cooling fluid flow channels.

11. The method according to claim 7 wherein the method is a resistance spot welding method, said method further comprising positioning a first spot welding electrode against the first structure opposite to the first skin and positioning a second spot welding electrode against the second structure opposite to the second skin.

12. The method according to claim 11 further comprising providing other spot welding electrodes, a first set of aligned openings through the second structure and the core, and a second set of aligned openings through the first structure and the core, and extending one of the other spot welding electrodes through the first set of aligned openings to contact the first skin opposite to the first spot welding electrode, and extending one of the other spot welding electrodes through the second set of aligned openings to contact the second skin opposite to the second spot welding electrode.

13. The method according to claim 7 wherein the method is a friction stir welding method, said method further comprising positioning a first stir welding probe against the first structure opposite to the first skin and positioning a second stir welding probe against the second structure opposite to the second skin.

14. The method according to claim 7 wherein the method is a laser welding method, said method further comprising aiming a laser beam source at a spot on the first structure or the second structure.

* * * * *